Nov. 7, 1961   W. W. HALLINAN   3,007,484
AUTOMATIC FLOOR DRAIN SHUT-OFF VALVES
Filed Sept. 9, 1958   7 Sheets-Sheet 1

INVENTOR.
WILLIAM W. HALLINAN
BY
ATTY.

Nov. 7, 1961  W. W. HALLINAN  3,007,484
AUTOMATIC FLOOR DRAIN SHUT-OFF VALVES
Filed Sept. 9, 1958  7 Sheets-Sheet 2
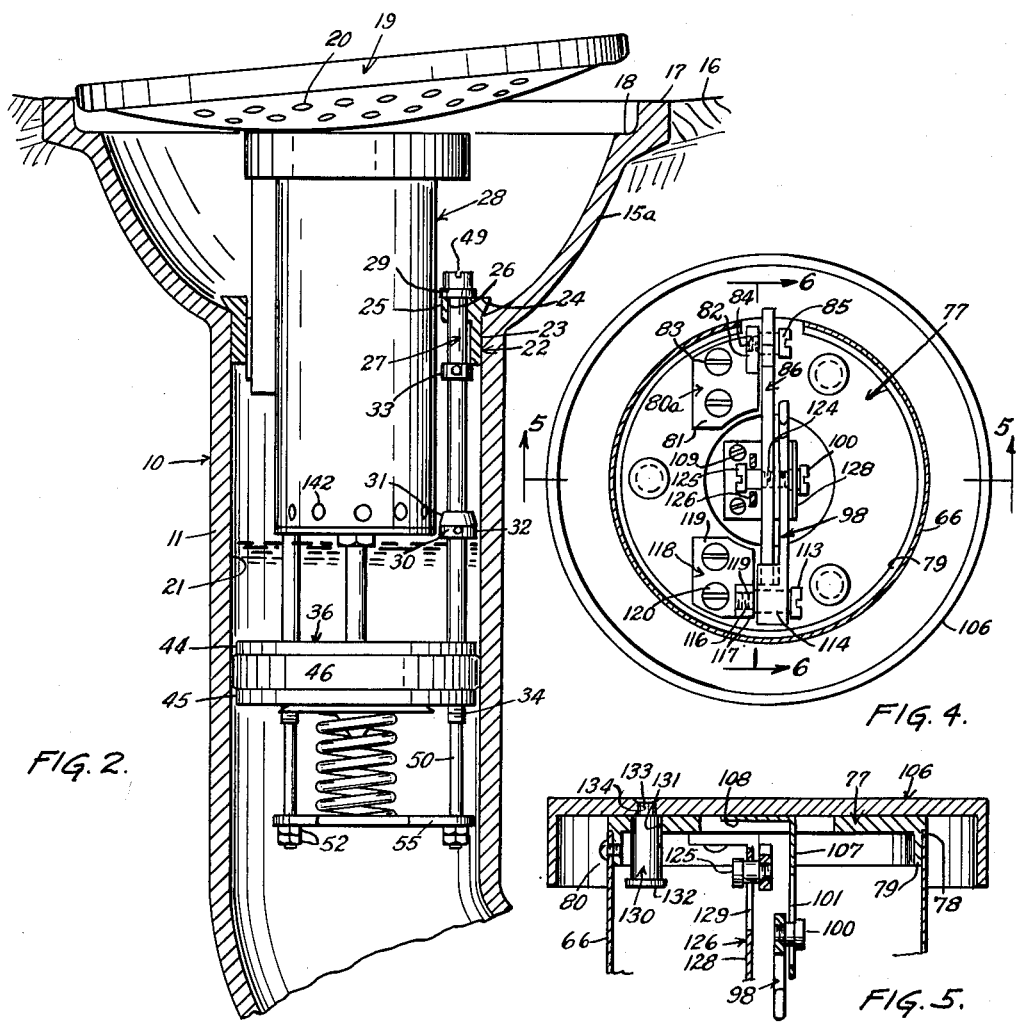
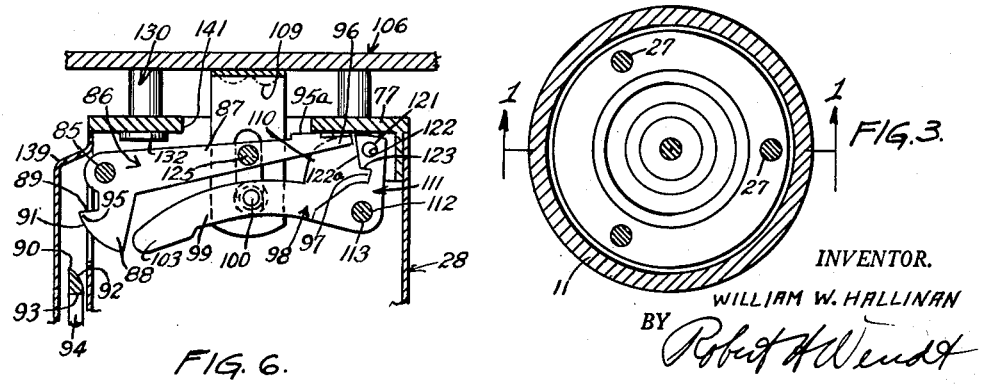
INVENTOR.
WILLIAM W. HALLINAN
BY Robert H Wendt
ATTY.

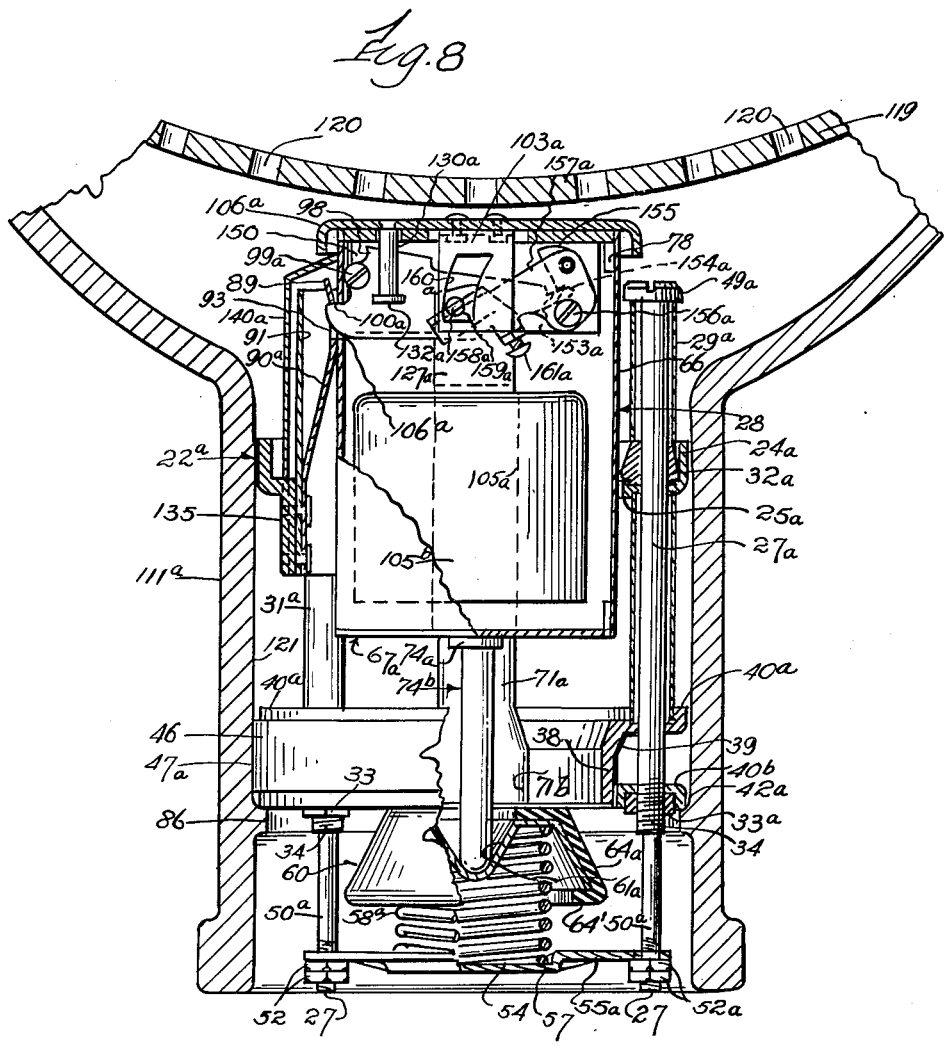

Nov. 7, 1961 W. W. HALLINAN 3,007,484
AUTOMATIC FLOOR DRAIN SHUT-OFF VALVES
Filed Sept. 9, 1958 7 Sheets-Sheet 4

INVENTOR.
William W. Hallinan
BY Robert H. Wendt
Attorney.

Nov. 7, 1961  W. W. HALLINAN  3,007,484
AUTOMATIC FLOOR DRAIN SHUT-OFF VALVES
Filed Sept. 9, 1958  7 Sheets-Sheet 5
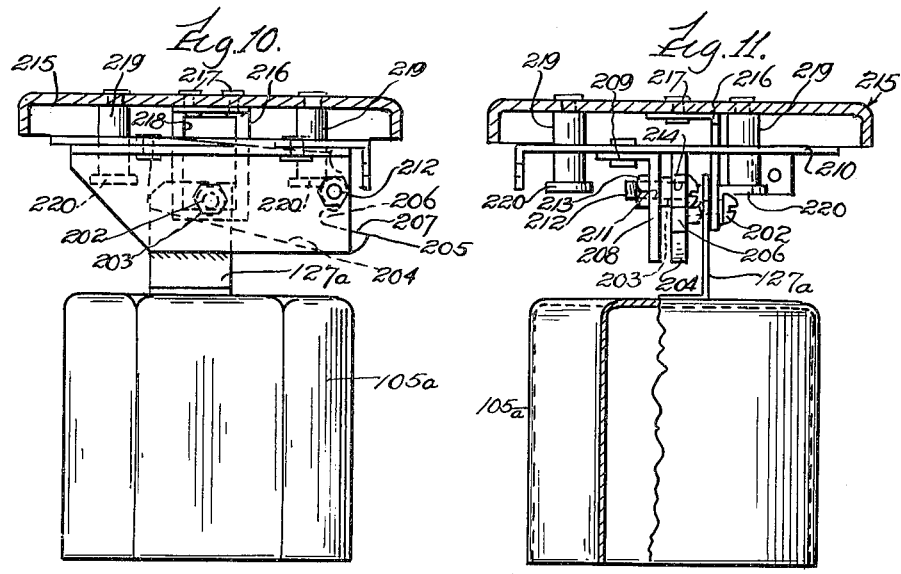
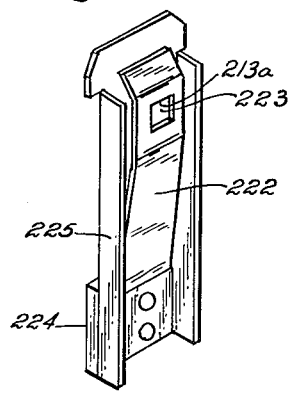
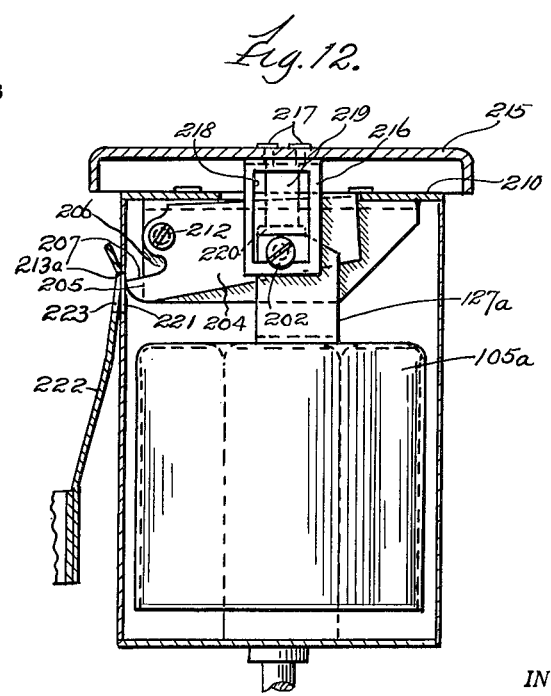
INVENTOR.
William W. Hallinan
BY
Robert H. Wendt.
Attorney Nov. 7, 1961 W. W. HALLINAN 3,007,484
AUTOMATIC FLOOR DRAIN SHUT-OFF VALVES
Filed Sept. 9, 1958 7 Sheets-Sheet 6
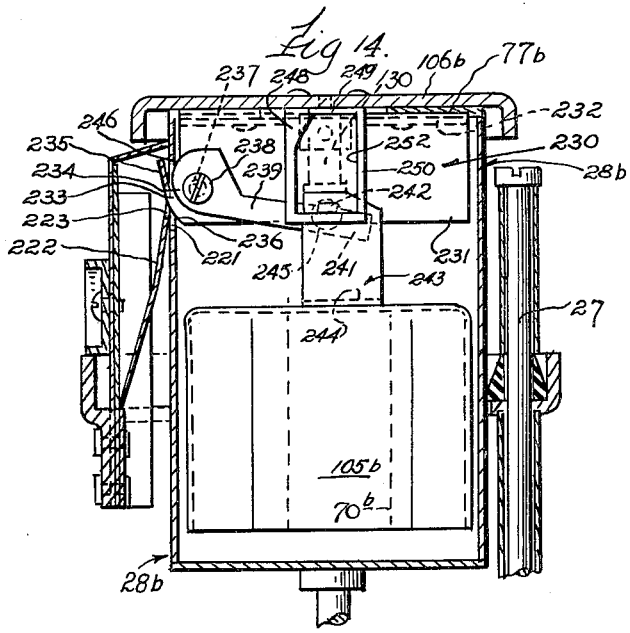
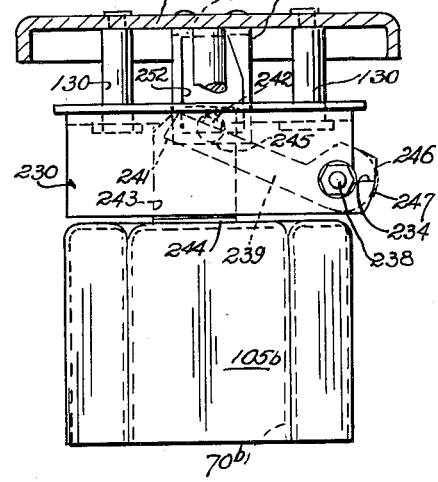
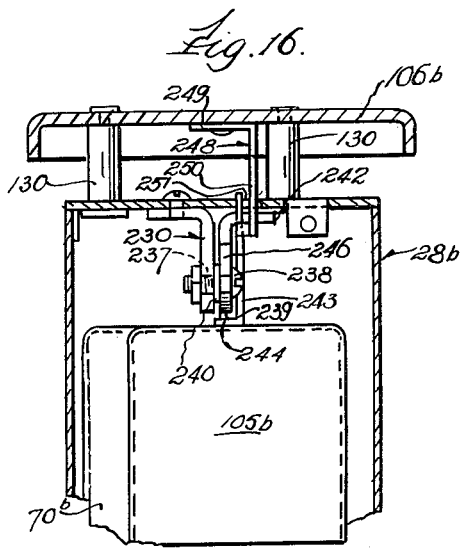
INVENTOR.
William W. Hallinan
BY Robert H. Wendt
Attorney

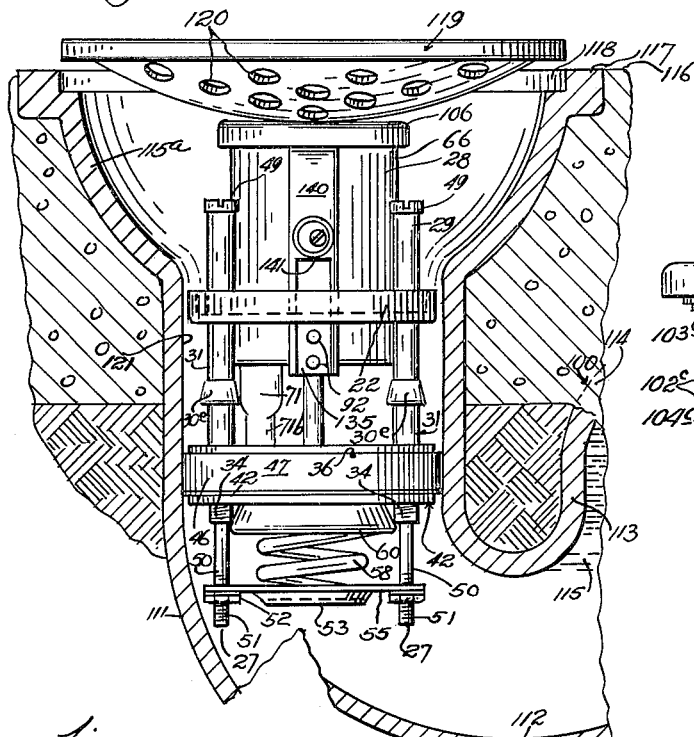
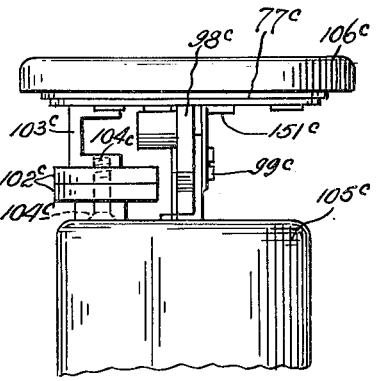
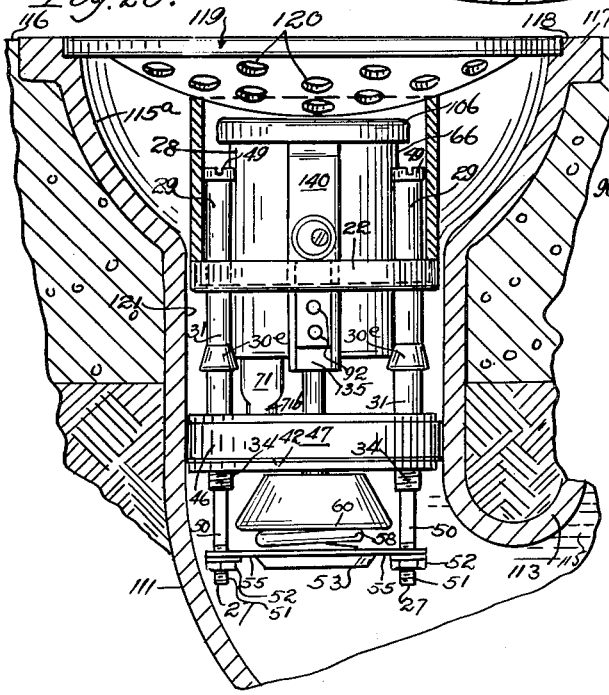
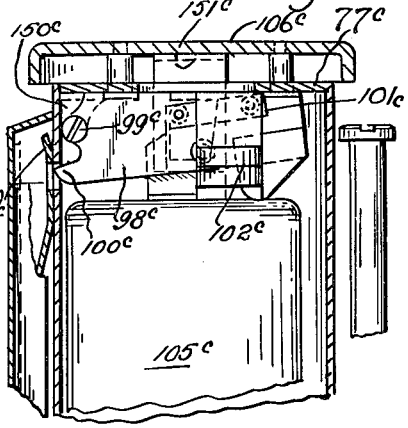

United States Patent Office 3,007,484
Patented Nov. 7, 1961

3,007,484
AUTOMATIC FLOOR DRAIN SHUT-OFF VALVES
William W. Hallinan, Racine, Wis., assignor to Hally Manufacturing, Inc., Racine, Wis., a corporation of Wisconsin
Filed Sept. 9, 1958, Ser. No. 761,663
30 Claims. (Cl. 137—410)

The present invention relates to automatic floor drain shut-off valves, and is particularly concerned with improvements in the automatic floor drain shut-off valves covered by my prior application, Ser. No. 568,803, filed March 1, 1956, now abandoned, and Ser. No. 752,773, filed August 4, 1958, now Patent Number 2,965,126, both incorporated by reference herein, and of which this application is a continuation-in-part.

One of the objects of the invention is the provision of an improved automatic floor drain shut-off valve of the class described, having a simpler type of latching mechanism, including a simple latching lever directly actuated by a float for tripping the valve or directly actuated by the cover in manually setting or tripping the valve and eliminating the sear mechanism employed by my prior applications.

Another object of the invention is the provision of an improved automatic floor drain safety device which will eliminate flooding of a basement when the water passage to the sewer from the floor drain has been clogged by tree roots in the sewer, causing the draining water from plumbing fixtures in the building, such as wash basins, sinks, toilets, and the like to back up through the floor drain and flood the cellar.

Another object of the invention is the provision of an improved automatic floor drain safety device which will eliminate the flooding of a basement which is caused by the water backing up from the main sewer during rainstorms.

Another object of the invention is the provision of a device of the class described which is positive and automatic in its action, and which indicates the closing of the valve to the user by tilting the regular floor drain cover up above the floor.

Another object of the invention is the provision of a simple, durable, automatic floor drain valve which is adapted to be manufactured cheaply, since most of its parts may be made of punch press stampings.

Another object of the invention is the provision of an improved device of the class described which may be installed by the user himself, and which may be removed at any time by the user for inspection or repair, thereby eliminating the cost of labor for installation or removal, and which is adapted to save the user many dollars in damage to materials stored in the basement, which would be spoiled in case of a flood in the basement.

Another object of the invention is the provision of an automatic floor drain valve which will insure continuous safety and freedom from service, and which can be readily removed for cleaning out the floor drain.

Another object of the invention is the provision of an improved automatic floor drain safety valve in which the float is protected from the water during the ordinary drainage through the floor drain; and as soon as back flow has tripped the float, the float is again protected from that water by being located above the valve and above the water level after tripping.

Another object is the provision of an improved automatic floor drain shut-off valve, having a simple type of latching lever which is very sensitive but positive in its action and having a snap action which is effected by the use of magnetic members.

Another object is the provision of an improved device of the class described in which the latch is adapted to be latched automatically, but the unlatching and tripping is accomplished by the use of a cam lever controlled by the float, eliminating the latching lever.

Another object is the provision of a plurality of forms of latching devices, each of which is controlled by a float and each of which is sensitive and positive in its action.

Another object is to provide an automatic float controlled cut-off valve in which the float is enclosed, but which has means for venting air bubbles from a point beneath the valve to the air space above the float.

Other objects and advantages of the invention will be apparent from the following description and the accompanying drawings, in which similar characters of reference indicate similar parts throughout the several views.

Referring to the drawings, of which there are seven sheets,

FIG. 2 is a fragmentary view similar to FIG. 1 with the parts in the position which they assume when the valve has been tripped and closed, raising the floor drain cover to indicate this fact;

FIG. 3 is a sectional view taken on the plane of the line 3—3 of FIG. 1;

FIG. 4 is a sectional view taken on the plane of the line 4—4 of FIG. 1, looking in the direction of the arrows;

FIG. 5 is a fragmentary sectional view, taken on the plane of the line 5—5 of FIG. 4, looking in the direction of the arrows;

FIG. 6 is a fragmentary sectional view, taken on the plane of the line 6—6 of FIG. 4, looking in the direction of the arrows, and showing the trigger mechanism after it has been tripped;

FIG. 8 is a view similar to FIG. 1 of a modified construction showing a different latching arrangement;

FIG. 10 is a fragmentary side elevational view of the latch and float of FIG. 9, taken from the rear side of FIG. 9;

FIG. 11 is a front elevational view similar to FIG. 10, taken from the right side of FIG. 10;

FIG. 12 is a fragmentary elevational view similar to FIG. 9, with the parts in the unlatched position;

FIG. 13 is a view in perspective of the resilient latching member and its housing;

FIG. 14 is a fragmentary sectional view showing a fixed latching member adapted to be controlled by a cam;

FIG. 15 is a fragmentary elevational view in partial section, taken from the rear side of the latching member of FIG. 14;

FIG. 16 is a front elevational view, taken from the right side of FIG. 15;

FIG. 17 is a fragmentary elevational view of the front of a modified latching mechanism employing one or more magnets and an armature to effect a snap action of a simple latching lever;

FIG. 18 is a fragmentary sectional view taken on a plane passing through the axis of the valve assembly when the mechanism of FIG. 17 is installed in the unit but is unlatched;

FIG. 19 is an elevational view in partial section showing the improved valve unit when it has been actuated and moved to closed position by the flow of back water;

FIG. 20 is a similar view showing the best mode of installation at the proper elevation by causing the drain cover to push downward on a cardboard spacing tube which drives the unit down to the proper elevation at which it should be installed to lift the drain plate when the valve is tripped.

Figure 1:
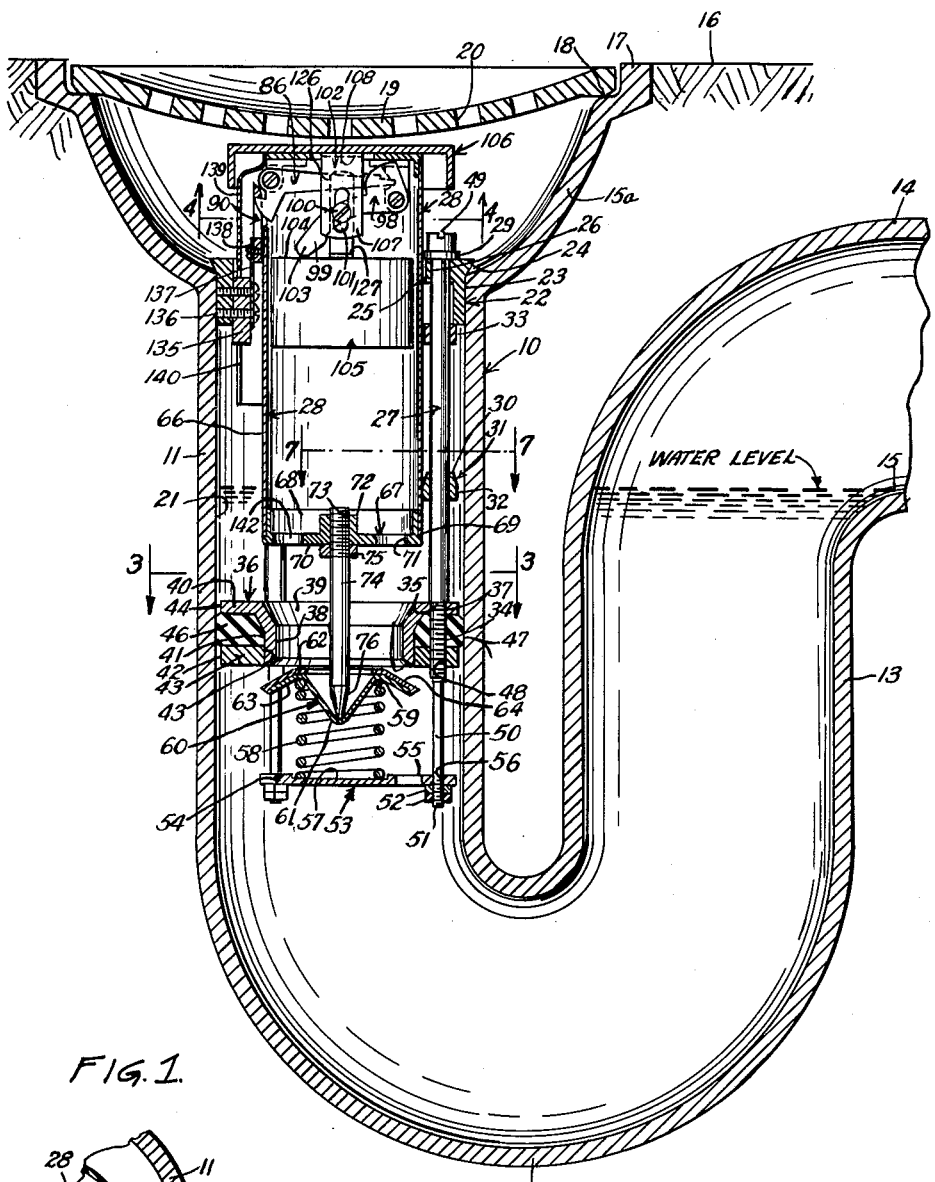
FIG. 1 is a vertical sectional view, taken on the plane of the line 1—1 of FIG. 3 of the floor trap and drain, showing the present automatic shutoff in partial section on the same plane.
Figure 7:
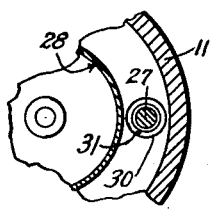
FIG. 7 is a fragmentary sectional view, taken on the plane of the line 7—7 of FIG. 1, looking in the direction of the arrows.

Referring to FIGS. 1 and 2, 10 indicates in its entirety the floor drain trap, which comprises a vertical cast iron pipe portion 11 joined to a U-shaped bend 12 at the bottom and having an upwardly extending pipe portion 13, which is again bent laterally at 14, the level of the water in the trap being at the highest point 15 in the bend 14.

The floor drain 10 is provided with a belled out opening portion 15a at the top which is flush with the top of the floor 16 at its upper edge 17, and which has an annular seat 18 for seating the drain cover 19, which has a multiplicity of holes 20 for passing drainage.

The vertical portion 11 of the drain trap has a cylindrical bore 21 within which the present automatic floor drain valve is installed. This device preferably includes a frame having an annular metal member 22 used as a support ring and having an outer cylindrical surface 23, which is receivable in the bore 21.

Above the cylindrical surface there is the frusto-conical enlargement 24, which tends to center the support ring 22 in the bore 21 and limits its downward motion so that it will be installed at a definite predetermined level.

Support ring 22 has a plurality of inwardly extending lugs 25, each of which has a vertical through bore 26 for passing the clamping bolts 27. In order to guide the float chamber 28 and the lugs 25 and bolts 27 are located at three equally spaced points; and the lugs 25 are spaced from the float chamber 28; but the bolts are provided with brass washers 29 projecting inwardly beyond the lugs 25 and serving to have a line contact with the float chamber in its vertical sliding motion.

This eliminates necessity for accurate machining of the inner surface of the lugs 25. Additional guides are preferably provided for the float chamber 28 in the nature of the short sleeves 30 located on each rod 27 and secured there by a set screw; and each sleeve is providing with a frusto-conical surface 31 guiding the float chamber 28 between the cylindrical surfaces 32 of the three sleeves with a suitable clearance for sliding.

Additional sleeves or collars 33 are located on the bolts 27 immediately below the support ring 22 and secured by set screws so that the bolts are rigidly mounted on the support ring 22 against sliding or other motion.

The three bolts 27 are threaded at 34 adjacent their lower ends, but spaced from the lower end, and are provided with an annular shoulder at 35 for engaging the packing casing 36, which has three apertures 37 for receiving the threaded portions of the three bolts.

The packing casing 36 may be made of a sheet metal stamping having a tubular portion 38 and a frusto-conical portion 39, which carries an outwardly extending radial flange 40. The tubular portion 38 is adapted to pass ordinary drainage through the frusto-conical bore 39 and cylindrical bore 38. The tubular portion 38 has an outer cylindrical surface 41 for receiving a lower pressure ring 42, which has a circular bore 43.

The outer edges 44 and 45 of the packing casing 36 and pressure ring 42 are cylindrical and spaced from the inner bore 21 of the drain casing 11 to permit insertion of the present device in spite of inaccuracies in the dimensions of the floor drain.

A resilient annular member 46 of rubber or synthetic resilient material, such as "Duprene," is located in the annular groove between the flanges 40 and 42 and is shaped to fit that space at the frusto-conical portion 39. The size of the resilient annular member 46 is such that its outer cylindrical surface 47 is also smaller than the bore 21; but when the device has been installed in the bore 21, the bolts 27 may be rotated; and the upper bores 37 permit the bolts to rotate freely at the threaded portion; but the pressure ring 42 has threaded bores 48 and the bolts have slots 49 at their heads for reception of a screwdriver.

Thus the bolts 27 may be rotated to draw the pressure ring 42 toward the radial flange 40, compressing the rubber member 46 and expanding it into water-tight engagement with the walls of the bore 21. This holds the device in proper position in the drain 10 and makes it necessary for all drainage through the packing casing 36 to pass through the central bore 38.

Each of the bolts 27 has a reduced cylindrical extension 50 which is threaded at 51 at its end and provided with a pair of lock nuts 52. These extensions 50 are adapted to support a spring seat 53 in the form of a circular metal plate having a minimum diameter, as indicated by the edge 54, and having three radially extending arms 55 provided with apertures 56 for receiving the reduced extensions 50.

The plate 53 has a centrally located stamped cylindrical depression 57 for receiving the end of a helical compression spring 58. The compression spring engages at its upper end in a V shaped annular groove 59 in the valve member 60.

Valve member 60 comprises a sheet metal stamping having a conical central portion 61 and having a reverse curve at 62 and a backwardly extending frusto-conical portion 63 serving as a valve seat. The valve seat 63 is surfaced with an annular frusto-conical layer 64 of resilient material, previously described, serving as a valve facing.

The angularity of the valve facing 64 is preferably around thirty degrees; and the valve seat 65 on the packing casing 36 is frusto-conical and of the same angularity.

The float chamber 28 comprises a cylindrical metal member having a cylindrical outer wall 66 and a flat bottom wall 67, which may be in the nature of a metal plug having an annular flange 68 fitting inside the side wall 66 and having an annular flange at 69 engaging the end of side wall 66.

The bottom wall 70 of the end member 67 has a plurality of apertures 71 for passing water or other liquid and also has a central hub 72 provided with a threaded bore 73 for receiving a valve actuating post 74 threaded therein and secured by a lock nut 75. Valve actuating post 74 comprises a cylindrical metal rod threaded at its upper end and provided with a conical point 76 which is rounded at its apex, and which engages inside the apex of the V shaped valve stamping 61.

The valve post 74 urges the valve member 60 into open position, as shown in FIG. 1, when the present device is latched in that position; and when released by movement of the post 74 upward, valve member 60 closes automatically under the force of the spring 58.

The valve member 60 automatically centers itself on the seat 65.

Float chamber 28 has its upper end closed by an end wall 77 (FIG. 4), which is cylindrical and has an annular shoulder at 78 engaging the upper edge of side wall 66. End wall 77 has an annular flange 79 that fits inside the side wall 66; and the flanges 68 and 79 may be secured by screws 80 passing through the side wall and threaded into flange 79 or 68. This permits access to the mechanism.

The end wall 77 supports a latch bracket 80a, comprising an angular metal member having attaching flange 81 and a pivot flange 82 at right angles to the attaching flange 81. Attaching flange 81 has through apertures for passing the screw bolts 83, which pass through this flange and are threaded into the end wall 77.

The pivot flange 82 has a threaded aperture 84 for receiving the pivot bolt 85, which has a head and a cylindrical body and a reduced threaded portion receivable in the threaded bore 84. The pivot bolt 85 has its cylindrical body passing through a latching lever 86, which has a bore for bolt 85 on which it is pivoted.

Latching lever 86 is in the form of a bellcrank, having an elongated arm 87 and a short arm 88 transversely thereto. The short arm 88 is formed on its outer side with an upwardly facing latching shoulder 89 for engaging the latch 90, which is carried by the support ring 22 and will be further described.

The latching shoulder 89 is adapted to clear the latch 90 in the position of FIG. 6, which is the unlatching position; and the arm 88 has a curved camming surface 91, which engages the curved camming surface 92 on the latch 90 to pivot the latching lever counterclockwise when the float chamber 28 moves down, carrying the latching lever 86.

Latch 90 also has a latching shoulder 93 located at the upper end of an aperture 94 in latch 90 for receiving the pointed portion 95 of the arm 88 in the latching position. The longer arm 87 of latching lever 86 is provided with a stop lug 95a for engaging the inside of the end wall 77; and the longer arm 87 is provided with a reduced rectangular extension 96 for engagement in the trigger socket 97 of trigger lever 98.

Trigger lever 98 comprises a bellcrank lever having a long arm 99 serving as a gravity weight for urging the trigger lever 98 in a counterclockwise direction in FIG. 6, and also serving as an extension for the manual tripping of the trigger lever. The longer arm 99 of trigger lever 98 (FIG. 1) carries a centrally located screw bolt 100 having a cylindrical body for reception in a slot 101 in a manual release bracket 102, and having a reduced threaded end threaded into a threaded bore in the trigger lever 98.

The slot 101 in the manual release bracket 102 is elongated to permit the trigger lever 98 to extend downward into a position where its end 103 engages the top 104 of float 105 when the device is latched.

There is a clearance between the lower end of slot 101 and screw bolt 100 when the parts are in this position so that the top cover 106, which carries the manual release bracket 102, may move upward until the end of slot 101 engages the bolt 100 and lifts the trigger lever 98 to unlatch the latching lever 86.

The manual release bracket 102 comprises a sheet metal member with a depending flange 107 having the slot or elongated aperture 101 and having the attaching flange 108, which is secured to the top cover 106 by screw bolts 109 threaded into bores in the top cover.

The trigger lever 98 has a short arm 110 (FIG. 6) which extends upwardly and is relatively wide, overlapping the end 96 of latching lever 86 and confining end 96 on one side. The trigger lever 98 has a sear or latching member 111 which is provided with a bore 112 for passing the pivot screw 113 which also passes through trigger lever 98.

The pivot screw 113 has a cylindrical body 114 engaging in complementary bores 112 in the sear 111 and trigger lever 98; and it has a reduced threaded extension 115 threaded into a threaded bore 116 in the depending lug 117 of a pivot bracket 118. Pivot bracket 118 has its attaching flange 119 secured by screw bolts 120, which pass through this attaching flange and are threaded into the end wall 77.

The end 96 of latching lever 86 is confined on its left side in FIG. 4 by the lug 117 that supports the pivot bolt 113. Sear 111 is fixedly secured to trigger lever 98 by a screw bolt 121 passing through trigger lever arm 110 and threaded into a threaded bore 122 (FIG. 6).

Sear 111 has a suitable clearance at its surface 122a with the end 96 of latching lever 86; and the sear has the rectangular socket 97 for receiving the end 96 and retaining it by means of the shoulder 123 when the latching lever and trigger are in the position of FIG. 1. The latching lever 86 has a centrally located threaded bore 124 receiving the reduced threaded end of a screw bolt 125 (FIG. 4) upon which the float 105 hangs by means of an upwardly extending stirrup 126.

Stirrup 126 has an attaching flange 127 soldered or brazed to the upper end of the float 105, and also has an upwardly extending flange 128, which is provided with a slot 129 for receiving the screw bolt 125.

The weight of the float when it is out of the water tends to pull the latching lever 86 downward at the right in FIG. 6 in a clockwise direction, causing its latching point 95 to move outward in position to engage the latch 90.

The top cover 106, which carries the latch releasing bracket 107, slides relative to the float housing 28 and has two positions. In the latching position top cover 106 is down against the end wall 77, as shown in FIG. 1. In the unlatching position top cover 106 is up, away from the end wall 77, as shown in FIG. 6.

For guiding the top cover 106 in its motion between these positions it is provided with three headed studs 130, which pass through bores 131 in end wall 77 and have the heads 132 located inside end wall 77. Studs 130 have reduced ends 133 located in bores 134 in top cover 106 and riveted over to secure them rigidly.

The studs 130 slide in the bores 131 and permit the top cover 106 to be used as a latch release by lifting the latch release bracket 102 that has bolt 100 mounted in the slot 101 and carried by the trigger lever 98. When the trigger lever 98 has its longer arm 99 lifted, the shoulder 123 of sear 111 moves clockwise in FIG. 6, releasing the end 96 of latching lever 86. Then the latching lever 86 can move counterclockwise to move the latching shoulder 89 out of engagement with latch 90.

The float 105 comprises a cylindrical metal member which is provided with flat end walls and cylindrical side walls of a diameter to be slidably received in the float chamber 28 for free movement. The float 105 carries the bracket 128, which pulls down on the bolt 125 by gravity, causing the latching lever 86 to move clockwise from the position of FIG. 6 when top cover 106 is in its lower position.

In order to latch the valve 60 in open position the support ring 22 carries the latch 90 (FIG. 1). For this purpose a metal block 135 is secured by a pair of screw bolts 136 inside the support ring 22. The same screw bolts carry a resilient metal leaf spring 137, which gives the latch 90 sufficient resiliency to move past the point 95 of the latching lever 86 when this lever is in the latching position.

At its upper end spring 137 carries a pair of screw bolts 138, which are threaded into the latching member 90. The latching member 90 comprises a rigid rectangular plate with the rectangular aperture 94 for receiving the point 95 of latching lever 86.

The latch also has the curved camming surface 92 and the latching shoulders 93 at the upper end of aperture 94.

In order to protect the latch against accumulations of debris and fuzz, the float housing 28 is provided at one side, near the top, with a latch housing 139. This comprises a channeled member of sheet metal closed at its upper end and on all four sides adjacent its upper end by being soldered to the side of the float housing 28.

The latch housing 139 has a slot 140 in its side wall extending up sufficiently to clear the block 135 that carries the latch 90. The length of this slot 140 is sufficient to permit the float chamber 28 to be moved down to the latching position of FIG. 1 and slightly past the latching position to facilitate the latching between the shoulder 89 and the shoulder 93.

The operation of the automatic floor drain stop valve is as follows:

It may be installed by the user merely by sliding it into the vertical portion 11 of the floor drain 10 until the frustoconical shoulders 24 prevent further downward movement. Screw bolts 27 may then be rotated in a clockwise direction by means of a screwdriver, drawing the pressure ring 42 upward, and expanding the annular rubber member outward.

The rubber member tends to hold the device in this position and establishes a water-tight seal at the outside of the member 46 so that all drainage in either direction must pass through the packing casing at bore 38.

During installation, the latching mechanism and float chamber are preferably removed from the frame. Therefore, at the time of its installation the valve 60 will be closed.

With the top cover 106 down against the end wall 77, the latching lever 86 is permitted to pivot downward to the position of FIG. 1 by action of gravity on the float which hangs from stirrup 128. The trigger lever 98 is pulled downward by gravity due to the weight of its long arm 99 so that the end 96 of latching lever 86 is located in socket 97 against shoulder 123.

This causes trigger lever 98 to depend, as shown in FIG. 1, to be engaged by the top of float 105 so that any upward motion of the float will lift the long end of trigger lever 98.

The device being devoid of water at this time, the parts remain in the latched position due to action of gravity; and the point 95 of latching lever 86 projects outward in position for the camming surfaces 91 and 92 to engage each other. If the top cover 106, now engaging the end wall 77, is then pushed downward, this will push the float chamber 28 downward with its post 74, opening the valve 60; and this motion may continue until the camming surfaces 91 and 92 (FIG. 6) on latching lever 86 and latch 90 engage each other, camming the latch 90 to the left in FIG. 1 until the point 95 can pass downward and snap into aperture 94.

The parts will then be latched as shown in FIG. 1; and the valve will be held open by latching lever 86, engaging latch 90, and being held there by sear 111 on trigger lever 98.

The device may then be unlatched by merely pulling upward on top cover 106, which will lift the unlatching bracket 107 and pull the trigger lever upward to the position of FIG. 6, unlatching the end 96 of the latching lever 86, which will then release the latch 90, permitting valve spring 58 to move float housing 28 upward to the unlatched position of FIG. 6 or FIG. 2.

Thus the valve may be closed manually at any time; and this will always be done before removing the device from the drain.

When the valve is latched in the open position, any water or other liquid passing into the drain 10 will pass through the space between float housing 28 and support ring 22 and through the valve aperture 38.

No water flows through the cap 106 or aperture 141, as this aperture is closed tightly by the cap 106. If water were allowed to flow through this aperture, it would flow over and around the trigger and other mechanism and would put the device out of order by accumulation of lint, soap, etc.

The water tightness of the top of the float housing is a very important feature because the only part that is touched by water is the bottom of the float at the moment of tripping; and after tripping, the float is raised well above the water line again.

The water level at this time is indicated by the dotted line and legend "Water Level" in FIG. 1; and there is ample space for the water to flow through the drain without raising the water level substantially. If the water should back up in the drain, it may pass through the valve aperture and through apertures 142 in the bottom of float housing 28; and it will cause the float 105 to rise, which will unlatch the device as follows:

The latching lever 86 is constantly pulled counterclockwise while it is latched, by the force of spring 58, which pulls down on latch 90, causing shoulder 93 to engage shoulder 89 during the latching. When float 105 engages the end of trigger lever 98, the trigger lever 98 is pivoted to the position of FIG. 6, releasing the latching lever 86.

When latching lever 89 is released to the position of FIG. 6, the point 95 clears the shoulder 93 of latch 90 and releases the float housing 28 from latch 90, permitting it to move upward, carrying with it the valve post 74, which has been holding the valve open. This permits valve 60 to be closed by spring 58. The unlatched float housing 28 moves to the position of FIG. 2, above the water level; and the float 105 being in the float housing 28, float 105 is also above the water line. Of course, the latching mechanism is always above the water line.

It should be noted that the float 105 is immediately raised above the current water level by the unlatching action and movement of the float housing 28 upward, thus keeping the float in a clean condition, where it will not be covered with encrusted debris dried in place.

It will thus be observed that the present mechanism permits draining through the cellar drain; and all of its moving parts are protected from such drain water. The float and operating mechanism are tightly enclosed from the top and sides so that no lint, dirt, etc. will contact any of the latching or trigger parts; and the moving mechanism may be made of non-corrodible material, except the latch 90, the latching lever 86, the trigger lever 98, and the sear 111, all of which will be made of bronze.

The valve and its seat are located well below the water line and will remain wet so that any lint or dirt will be washed off as water flows through them. The water that operates the float enters near the bottom of the float housing below the water level through the ports 142; and there is little chance of lint or dirt entering from this source.

It should be noted that when the device is latched in open position all the ports 142 are located below the water line to keep soaps, lint, and dirt from drying on the parts that are located above the water line. All parts of the mechanism except the float itself are always above the water line.

When water from the sewer backs up to the trip elevation, shown in FIG. 1, the entire float housing and its mechanism will snap upward one inch, again lifting the float out of the water; and the tightly closing valve will prohibit any further rise in the water level.

When the device trips, closing the valve and raising the float housing, the top cover engages the regular floor drain cover and lifts it up above the floor, indicating to the user that the device has been unlatched and the valve is closed.

The latching lever and trigger are automatically reset to the latching position by action of gravity, when the valve 60 is opened by manually depressing the cap 106, which also engages and depresses the float chamber until the point 95 of latching lever 86 enters aperture 94.

Whenever the device is to be installed, the cap 106 should first be forced downwardly to open the valve and give the latching mechanism an opportunity to snap into place, holding the float chamber down and the valve 60 in open position. Then the device is in position to be installed in a drain.

The present device may be installed in any standard drain, which it will positively close upon the backing up of any water in the drain sufficiently to raise the float.

Referring to FIG. 8, this is a fragmentary sectional view, showing an improved form of latch with a sear used in the commercial embodiment of the invention. In this embodiment the frame includes an upper stamped ring 22a, having a plurality of inwardly extending flanges 25a with through apertures for passing the bolts 27a, of which there are preferably three equally spaced.

The bolts 27a are provided with spacers 29a and 31a and conical ferrules 32a between their heads, in each case, and a lower packing ring 40a, which has holes for the bolts 27a. The packing ring 40a has a cylindrical body 38a, forming a port for the valve 64a, which is shown in open position.

Packing casing 40a has a resilient annular packing member 47a of Duprene which is also traversed by the bolts 27a and is clamped by a sliding ring 40b, having holes for the bolts.

The bolts are provided with threaded ends and nuts 33a located in channeled ring 42a, so that the nuts cannot turn; and the turning of the heads 49a of the bolts causes a clamping of the packing 47a, which is expanded into engagement with the inside of the pipe 111a.

The valve 64a has a covering of soft rubber extending over its top, sides, and bottom, and is urged toward the seat by a coil spring 58a. The coil spring 58a is seated against the plate 55a, which is carried by bolt extension 50a, having lock nuts 52a.

The valve 64a has a conical stamped depression 61a, receiving the metal post 74b, which is carried by the bottom of a float chamber 67a. The float chamber 67a has a depending sample tube 71a, which extends to a point just below the valve seat when the valve is open.

As the valve is opened by the post 74b carried by float chamber 67a, when the valve is closed by upward movement of the post 74b, the sample tube 71a is also moved upward with the float chamber. The float chamber 67a is a cylindrical metal body sliding between the conical spacers 32a on the bolts; and it moves from a lower latched position, shown in FIG. 8, to an upper position in which the valve is closed.

The float chamber 67a has an upper sliding cap 106a mounted on three headed studs 130a, having heads 132a, so that the cap may be pulled upward to unlatch the mechanism. The float chamber carries a pivot bracket on its lower side of its upper wall and a sear 157a is pivoted at 156a on the bracket and is also pivotally connected at 158a to a float bracket 127a, which has a hole 159a for lug 158a.

The sear 157 is adapted to secure the end of a latching lever 153a to a shoulder 154a; and the latching lever is pivoted at 99a and has a shoulder 100a engaging in an aperture in a resilient leaf spring latching member 90a, which is carried by the ring 24a and covered with a housing 140a.

The latching lever 153 has an adjustable stop in the form of a screw 161a carried by a laterally projecting lug and engaging the lower side of the sear 157a.

The float 105b comprises a generally cylindrical cup open at the bottom and having a pressed lateral groove 105a in its side for passing upward any bubbles which come up the sample tube 71a. The float 105b carries the float bracket 127a at its upper end pivotally connected to the sear 157a.

The top cover 106a carries a depending bracket 103a, having an aperture 160a about the lug 158a, so that an upward pull on the cover 106a lifts the sear and trips the latch 153a.

The operation of this embodiment is substantially the same as that described with respect to FIGS. 1-7.

Referring to FIGS. 9-13, these are views showing a modified form of latch which does not have a sear, but comprises a simple latching lever. The automatic valve preferably contains all of the same elements previously described; but the packing 47 may have an auxiliary disc 200 of thin cellulose acetate clamped between the packing 47 and the lower ring 42a on the bolts 27.

This acetate ring may be twenty thousandths of an inch in thickness and is over size with respect to the inside of the pipe 111, so that the unit must be forced into the pipe 111, deforming the acetate ring 200, as shown at 201, and frictionally holding the unit in the pipe at the position to which it is forced.

This precludes the loss of any unit by dropping it into the drain and holds the unit at such an elevation that when it is latched, it is located immediately below the drain cover 119, to lift the drain cover, an indication that it is unlatched and has the valve closed.

In this embodiment of the invention the float 105a has a float bracket 127a which is provided with a screw bolt 202 passing loosely through an aperture in the bracket. The screw bolt 202 is screwed into a threaded bore 203 in the pivoted latch member 204, where it is secured by a lock nut.

The latching lever 204 has a pointed end portion 205 provided with an indentation 206 forming a latching shoulder 207. This latching lever 204 is pivoted on a bracket 208 of the angle type, having one flange 209 riveted to the top 210 of the float housing.

Bracket 208 has a threaded bore 211 for receiving a threaded screw bolt 212 threaded into the bore and secured by a lock nut 213.

Latching lever 204 has a bore 214 passing the bolt 212, which preferably has a washer between the bracket 208 and latching lever 204.

The cover 215 has a depending angle bracket 216 with one flange riveted to the cover at 217 and a depending flange having a rectangular aperture 218. The aperture 218 passes about the screw bolt 202 so that the cover may be used to lift the float and the end of the latching lever 204 to trip the mechanism.

The cover is provided with three headed studs 219, the heads 220 of which limit the upward sliding motion of the cover on the top 210 of the float housing. The enlarged aperture 218 provides a lost motion connection about the screw bolt 202 and permits the cover to be pushed downward until it engages the top 210 of the float housing, after which it pushes the float housing down to close the valve and permit the latching lever 204 to move into latching position by gravity.

The float housing has an aperture 221; and the spring keeper has an aperture 223; and these apertures register and are adapted to receive the pointed end 205 of the latching lever 204 when the float housing is moved down to the latching position.

Figure 9:
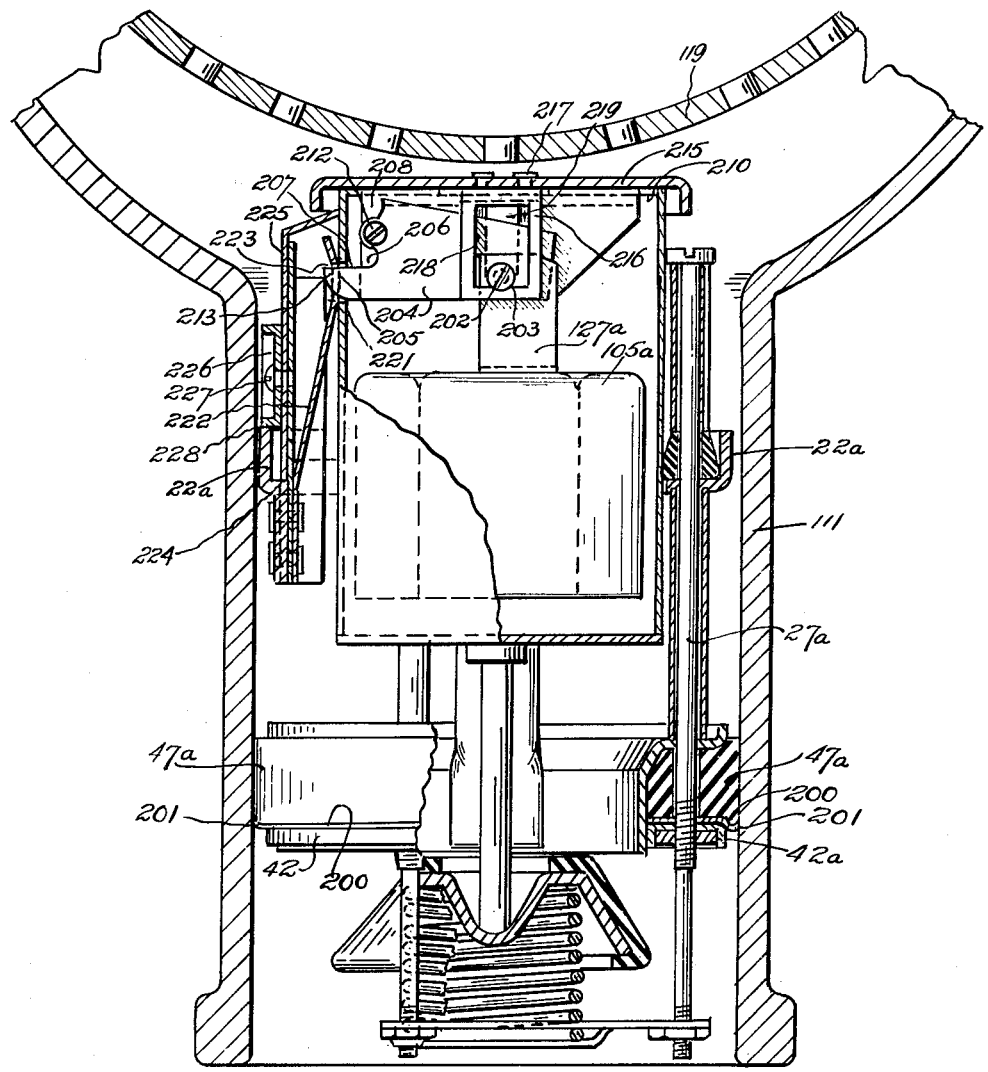
FIG. 9 is a similar view of a third type of latching arrangement, having a simple latching lever without a sear.

This latching position is shown in FIG. 9. The operation of this embodiment of the invention is the same as those previously described except that the latching member is a simple latching lever combined with a resilient spring keeper.

The downward motion of the float housing when it is being latched is stopped by the wall 224 of the keeper housing 225, previously described; but due to inaccuracies of manufacture there may be some back-lash in the latching mechanism when the parts have become latched and the float housing is permitted to rise again in FIG. 9 until the shoulder 207 engages the top of aperture 213a in the spring latch 222.

This back-lash or movement sometimes might result in accidental release of the mechanism; and the mechanism is preferably provided with a cam shaped stop member 226 mounted on the keeper housing 225 on a pivot screw 227 and adapted to be rotated until it engages the upper edge 228 of the support ring 22.

This cam shaped stop 226 may be adjusted at the factory so that there is no back-lash or free motion between the latching members in the latched position; and this is desirable because it makes the latching mechanism more stable and less likely to be tripped accidentally.

All of the other parts of the mechanism may be substantially as described before; but FIGS. 9–13 illustrate another form or modification of latching mechanism that may be employed.

Referring to FIGS. 14–16, these are fragmentary views in partial section, showing another modification of the latching mechanism.

In this embodiment of the invention the float chamber 28b has its top 77b provided with an angle bracket 230 provided with a wide vertical flange 231 and a horizontal flange 232, which is riveted to the top 77b.

The vertical flange 231 is provided with a pointed latching extension 233 having an upper latching shoulder 234 for engagement with the latching keeper 222 made of spring steel and supported as previously described.

The spring keeper has an aperture 223 in alignment with an aperture 221 in the float housing 28b; and the spring keeper 222 is urged into engagement with the side of the float housing 28 and has a backwardly turned upper end 235 acting as a camming surface when the float housing is inserted into the unit between the bolts 27.

During such insertion the latching extension 233 also engages with its camming surface 236 striking the upper end 235 of the keeper 222 and forcing it back until the latching extension 233 extends into aperture 223 in latching position.

As the bracket 230 is fixed on the top 77 of float housing 28b, it cannot move to unlatch the mechanism; but bracket 230 is provided with a threaded bore 237 for receiving a screw bolt 238 pivotally supporting a camming lever 239, which controls the latching mechanism and has an aperture 240 for the bolt 238. A washer 240 is preferably interposed between bracket 230 and camming lever 239. Camming lever 239 has a relatively long horizontal extension 241 which is provided with a laterally turned lug 242 above the center of the float 105b.

The float 105b may be as previously described, being a bottom open drawn metal cup having a generally cylindrical wall and a vertically extending pressed groove 70b. The float 105b has a supporting angle bracket 243, the horizontal flange 244 of which is brazed to the top of the float, and the vertical flange of which has an aperture 245 for receiving the lug 242 on the camming lever 239.

Thus the float 105b hangs freely on the lug 242 of the camming lever 239. When the float rises, it is adapted to lift the camming lever 239. At its left end the camming lever 239 has a cam formation 246 of increasing radius, beginning with a minimum radius at 247; and at the minimum radius, with the camming lever 239 down in the position of FIG. 14, the periphery 246 of the camming lever is withdrawn behind the edge 236 of the latching extension 234.

When the camming lever 239 is pivoted upward in FIG. 14 counterclockwise to the position of FIG. 15, the camming edge 246 projects beyond the edge 247 of the latching extension 234; and the spring keeper 222 is forced backward off the shoulder 234, thus unlatching the keeper 222 by moving the keeper back.

Thus a rise of the float 105b is adapted to lift the camming lever 239 and unlatch the keeper from the fixed shoulder 234. In effect, the keeper becomes the movable latch member, cooperating with the fixed latch on the bracket 230.

As previously described, the cover 106b is provided with the same studs 130b, slidably supporting the cover on the float housing 28b; and the cover may move between the position of FIG. 14 to that of FIG. 15.

The cover 106b has an unlatching bracket 248, comprising an angle bracket having one flange 249 riveted to the bottom of the cover and another vertical flange 250 extending through an aperture 251 in the top of the float housing 28.

The vertical flange 250 of angle bracket 248 has an enlarged aperture 252 surrounding the lug 242 so that the lifting of the cover 106b lifts the camming lever 239, as shown in FIG. 15, to unlatch the keeper from the extension 234.

Pushing the cover down to the position of FIG. 14 withdraws the camming edge 246 into the float housing 28 by pushing the camming lever 239 downward.

Thus the present latching mechanism may be controlled in the same way as the others described.

The float housing 28b is latched in lower open valve position by pushing down on cover 106b, and it may be unlatched and released to the closed valve position by pulling up on the cover 106b or by having back water lift the float 105b.

Referring to FIGS. 17 and 18, these are views of another modification of the latching mechanism, which includes a simple latching lever with the same type of keeper and a magnet and armature for effecting a snap action.

The latching mechanism is preferably mounted upon a supporting plate 77c of circular shape and provided with a pivot bracket 150c depending therefrom and secured thereto by an angle flange 151c. Pivot bracket 150c pivotally supports a latching lever 98c by means of a pivot screw 99c located adjacent the shorter end of the latching lever 98c, which is provided with a latching shoulder 100c.

The latching lever 98c is provided with an armature 101c projecting laterally from the lever and secured thereto by a plurality of screw bolts; and the armature 101c comprises a rectangular block of metal located immediately above one or more permanent magnets 102c.

The permanent magnets 102c are preferably of U shape and are also supported by the plate 77c, which may have a U shaped bracket 103c secured to plate 77c by screw bolts, and having the magnets 102c clamped to its lower flange by a screw bolt 104c and a clamping plate 104d. Screw bolt 104c, clamping plate 104d, and bracket 103c are all preferably made of brass or some other nonmagnetic metal; and the armature 101c is made of sufficient width to embrace or engage both of the legs of the U shaped magnets 102c.

In the position shown in FIG. 18 the latching lever 98 is unlatched; that is, in its uppermost position when moving counterclockwise in FIG. 18, as this places the latching shoulder 100c out of range of engagement with the latch 90c, further to be described.

The latching lever is held in latched position by the permanent magnets 102c when it is in the position of FIG. 18, at which time a certain amount of force is exerted on the latching lever by the spring 58c and other mechanism, tending to turn the latching lever counterclockwise in FIG. 18; but this is resisted by the magnets acting on the armature.

The present modification may, therefore, include only a simple latching lever, the movement of which is controlled by the float subject to the release of the armature by the magnet.

This provides a snap action which is positive and a latching action which is sensitive and adapted to be controlled by the lifting of the float by water backing up in the drain pipe.

Referring to FIG. 19, this is a view showing the proper elevation of the floor drain valve assembly in a drain pipe at such an elevation that the top cover 106 lifts the apertured strainer plate 119 when the float housing is unlatched by water rising and lifting the float. Since the apertured drain plate 119 may be of different proportions, it is difficult to ascertain the proper elevation of the drain valve assembly.

For this purpose FIG. 20 shows a cardboard tube surrounding the upper ends of the bolts and resting on the support ring 22 and projecting upwardly into engagement with the drain cover 119. The length of this cardboard tube, which is later thrown away, is such that it projects above the top cover 106 when the when the unit is latched; but when the unit is unlatched, as shown in FIG. 19, the top cover 106 extends above the cardboard tube.

This assures the proper elevation of the drain valve assembly in the drain because the plastic ring 201, which projects from the packing casing (FIG. 9), will hold the valve assembly at the desired elevation; and it is only necessary to put a cardboard tube, as shown in FIG. 20, on the upper end of the unit and then to place the drain cover 119 on the cardboard tube and push the unit down by pushing down on the drain cover to the position of FIG. 20.

The plastic holding ring 201 (FIG. 9) holds the unit in this position; and the drain cover may be lifted, the cardboard tube removed, and the screw bolts tightened to expand the packing and secure the unit in the drain at that elevation. This assures an indication that the valve is closed by lifting the drain cover, as shown in FIG. 19, when the valve closes.

It will thus be observed that I have invented an automatic floor drain shut-off valve assembly which may include any of a plurality of different types of latching mechanism.

The present device may be latched with its valve open by merely pushing down on the top cover; and it may be unlatched manually by lifting up on the top cover. When latched in open position, ordinary drainage may run down through the valve assembly and out of the drain pipe; but whenever any water backs up in the drain in sufficient amount to raise the float, the latch is tripped and the float housing moves upward, closing the valve and lifting the floor drain plate to indicate to the user that the valve is closed.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an automatic cellar floor drain shut-off valve assembly to be used in a floor drain trap having an upper pipe opening at floor level to receive drainage, said trap retaining water at a predetermined water level, establishing a water seal against sewer gas, the combination of a floor drain pipe with a frame including an upper supporting ring to be received in said drain pipe opening to support the frame, a packing casing hanging below said ring in said pipe said packing casing having an upper flange, a lower flange, and a cylindrical tubular portion and carried by a plurality of bolts passing through apertures in said ring and having spacing means engaging the top of said packing casing, and having threaded ends in threaded bores in the lower flange of the packing casing, a resilient annular packing member in said packing casing, said resilient member having a sliding fit in the pipe, and being expanded into water-tight engagement with said pipe by rotating, at their heads, the said bolts, which support said packing casing below the water level of the trap, said packing casing confining the resilient packing member on all other sides to expand it toward the pipe, said packing casing having a central drain aperture, a spring pressed, self-centering valve below said aperture to shut off back water below the water level, a float housing slidably mounted between said bolts, and having a depending stem engaging said valve and opening said valve against its spring, a latch on said frame, a latching lever in said float housing engaging said latch to latch the float housing in lower valve open position, and a float in said float housing, to control said latching lever and release said latched float housing upon flow of back water in said pipe in sufficient amount to raise the level and raise the float, water draining from the floor through said pipe and trap without raising the float sufficiently to trip the latching lever, the float and latching lever being maintained above the water level by being lifted with the float housing when the latching lever is tripped.

2. An automatic floor drain shut-off valve according to claim 1, in which the float housing has a movable top cover with a depending bracket having a pin and slot connection to said latching lever, said cover excluding drain water from the float housing, which may be latched in valve open position by a down push on the cover and float housing, or unlatched by an up pull on the top cover.

3. An automatic floor drain shut-off valve according to claim 1, in which the packing casing has a lower partially conical seat about its central aperture, and the valve has an upwardly open conical socket for receiving the end of said stem, and the valve has a partially conical face covered with a resilient facing engaging said seat and self-centered thereon by pivoting on the end of said stem.

4. An automatic floor drain shut-off valve according to claim 3, in which the bolts support a valve seat plate and the valve is a sheet metal stamping, having a lower annular V groove with one end of a compression coil spring seated in the groove, and the other end of the spring reacting on the seat plate carried by extensions of said bolts.

5. An automatic floor drain shut-off valve according to claim 2, in which the depending bracket has a pivoted connection to a trigger lever, which latches and controls the latching lever, an up movement of said cover lifting the trigger lever to unlatching position, or a down movement of said cover depressing the trigger lever toward latching position, for manual release or set by movement of the cover.

6. An automatic floor drain shut-off assembly comprising a drain pipe having a cylindrical bore forming an inlet for drainage, a packing casing comprising a tubular ring provided with an annular flange at one end and forming a valve seat for a central port at the other end, said casing having an annular resilient packing ring on said tubular ring, and having a second expansion ring slidably mounted on the first packing casing ring for compressing the resilient packing, a plurality of screw bolts forming a frame for the valve assembly and having upper heads disposed in accessible position at the upper end of the drain pipe, the said screw bolts having threaded lower ends engaging complementary threads forcing said expansion ring to compress the resilient packing when the screw bolts are rotated, for providing a water-tight seal with the inside of the drain pipe and for securing the assembly in the drain pipe, a supporting ring carried by the screw bolts adjacent their upper end, a spring pressed valve for closing the port in said packing casing, a float housing slidably mounted between said screw bolts and having a valve actuating post for engaging and opening said valve, a resilient latching keeper mounted on said supporting ring and extending upward, a latch controlling member mounted on the inside of said float housing adjacent its top, and having a latching shoulder at its end projecting through an aperture in the float housing into position to engage said latching keeper and a float mounted in said float housing and adapted to disengage said latching member from said keeper, the float and latch controlling member moving into latching position by gravity, when the valve is opened by manually depressing the float housing to the latching position.

7. An automatic floor drain shut-off assembly according to claim 6, in which the float housing has a cover with a depending flange movably mounted on the top of the float housing for directing drainage downward over the float housing, the said cover having a bracket depending into the float housing and loosely connected to the latching lever, whereby the lifting of the cover will trip the controlling member, and a push downward on the cover places the parts in position to be latched.

8. An automatic floor drain shut-off assembly according to claim 6, in which the latch controlling member is formed with a projecting and carrying said shoulder on its upper side, and having a beveled surface on its lower side, the beveled surface camming the resilient keeper backward until it snaps over the end of the latching lever.

9. An automatic floor drain shut-off assembly according to claim 6, in which the float has an upwardly extending bracket provided with an aperture for passing a pivot member which is secured to the latch controlling member, and the float has a relief groove in its side for passing air bubbles.

10. An automatic floor drain shut-off assembly according to claim 9, in which the bottom of the float chamber is closed except for a depending sample tube extending downward adjacent one side of the float chamber to a point between the valve and the valve port to discharge upward any air bubbles which might otherwise tend to lift the float.

11. An automatic floor drain shut-off assembly according to claim 6, in which the latching keeper is enclosed in an elongated box-like housing closed at the top and preventing drain water from running over the latching keeper.

12. An automatic floor drain shut-off assembly according to claim 11, in which the latching keeper housing carries a rotatably mounted cam shaped stop member carried by a threaded member and adapted to be clamped in any of a plurality of rotative positions to be adjusted to prevent any back-lash in the latching mechanism.

13. A valve assembly according to claim 6, in which the latch controlling member is held in latched position by a magnet and armature and the magnetic force is overcome by the lifting of the float, resulting in a snap action.

14. A valve assembly according to claim 6, in which the float housing carries a rigid latch and the latch controlling member is a pivoted lever with a cam forcing the latch keeper to unlatched position upon lifting of the float.

15. A valve assembly according to claim 6, in which the latch controlling member is a lever directly connected to the float which unlatches said lever by lifting of the float.

16. A valve assembly according to claim 6, in which the latch controlling member is a trigger lever having a sear and the sear engages the long end of a latching lever having a latching shoulder at its short end engaging the keeper, and the latching lever has a lug and threaded member engaging the trigger lever to adjust the latched position of the sear.

17. A valve assembly according to claim 16, in which the float housing carries an adjustable stop comprising a rotatable cam and clamping threaded member.

18. A shut-off assembly according to claim 6, in which the float housing is enclosed at its bottom but has a depending sample tube extending from the bottom to a point below the valve port, to vent air bubbles through the tube and float housing.

19. A shut-off assembly according to claim 18, in which the float has an indented groove in its side above the sample tube to permit air bubbles to pass the float.

20. A shut-off assembly according to claim 18, in which the latch controlling member is isolated from the air bubbles by a supporting bracket carrying the latch controlling member on the side opposite to the sample tube.

21. An automatic floor drain shut-off assembly according to claim 6, including an expandable non-metallic tube surrounding the bolts and resting upon the supporting ring and extending upward above the top of the assembly when latched in open position, but located below the top of the assembly when unlatched in closed position, the said tube determining the proper elevation of the assembly in a drain pipe by engaging a drain cover plate when the assembly is being installed.

22. An automatic floor drain shut-off assembly according to claim 21, in which the packing casing also supports a resilient and over-size annular sheet member projecting outwardly sufficiently to engage the wall of the drain pipe frictionally to hold the assembly at the desired elevation in the drain pipe after insertion by hand while tightening the bolts and expanding the packing.

23. An automatic drain shut-off valve assembly comprising a frame having an upper ring and a lower ring, said lower ring having a packing casing provided with an inner valve port and seat and an outer resilient packing adapted to engage in a conduit and means to compress said packing and expand it laterally to hold the frame in fixed position and to establish a liquid-tight seal with said conduit, a spring pressed valve carried by said frame and comprising a rubber covered tapered member adapted to engage said seat in said port, a valve controlling member slidably mounted in said frame and having a central depending valve actuating post engaging said valve, latching means for latching said valve controlling member in a lower valve open position, and a float actuated by liquid rising through said port for releasing said latching means upon back flow of liquid through said port, said spring closing said valve upon said release, but permitting down drainage through said port until said release.

24. An automatic floor drain shut-off assembly according to claim 23, in which the packing casing also supports a resilient over-size annular sheet member projecting outwardly sufficiently to engage the wall of the conduit frictionally to hold the assembly at the desired elevation in the conduit after insertion by hand while tightening the bolts and expanding the packing.

25. An automatic shut-off valve assembly according to claim 23, in which the latching means comprises a resilient keeper carried by said upper ring and a pivoted latching member carried by said controlling member.

26. An automatic shut-off valve assembly according to claim 23, in which the controlling member is a float housing enclosing the float and latch mechanism and protecting the same against dirt and grime from above, the float housing and float rising above the water level when unlatched.

27. An automatic shut-off valve assembly according to claim 26, in which there is a cover cap movably mounted on the top of the float housing and connected to the latching mechanism to effect an unlatching by upward movement of the cap.

28. An automatic shut-off valve assembly according to claim 26, in which the float housing is closed at the bottom, but provided with an open depending sample tube for conveying back flow into the float housing to actuate the float.

29. An automatic floor drain shut-off valve according to claim 1, in which the latching lever is controlled by a trigger lever and the latching lever has a short vertical latching arm with a latching shoulder and a beveled cam, said latching lever having a long horizontal arm to engage said trigger lever, said trigger lever being pivoted on the inside of said float housing and having a short vertical arm provided with a trigger socket receiving the end of said latching lever and having a long trigger arm extending horizontally and downward to be engaged and lifted by said float, said latching lever and trigger lever moving by gravity into latched position and being movable into unlatched position by lift of the trigger lever by the float.

30. An automatic floor drain shut-off valve according to claim 2, in which the drain has a drain cover and in which the float housing when unlatched is raised by valve and spring above the water level, lifting the drain cover to indicate a valve closed position to the user.

References Cited in the file of this patent

UNITED STATES PATENTS

| | | |
|---|---|---|
| 565,320 | Barratt | Aug. 4, 1896 |
| 1,069,579 | Roblee | Aug. 5, 1913 |
| 1,149,675 | Nix et al. | Aug. 10, 1915 |
| 1,341,563 | Kaufman | May 25, 1920 |
| 1,545,762 | Hadka | July 14, 1925 |
| 1,721,746 | Pearson | July 23, 1929 |
| 1,753,724 | Shaw | Apr. 8, 1930 |
| 2,387,858 | Russel | Oct. 30, 1945 |
| 2,580,637 | Wright | Jan. 1, 1952 |
| 2,729,382 | Weber | Jan. 3, 1956 |

FOREIGN PATENTS

| | | |
|---|---|---|
| 411,988 | Great Britain | June 21, 1934 |